(12) United States Patent
Macken et al.

(10) Patent No.: US 11,500,210 B2
(45) Date of Patent: Nov. 15, 2022

(54) METHOD AND SYSTEM FOR ADJUSTING LUMINANCE PROFILES IN HEAD-MOUNTED DISPLAYS

(71) Applicant: BAE SYSTEMS plc, London (GB)

(72) Inventors: Ian Thomas Macken, Rochester (GB); Rory Thomas Alexander Mills, Rochester (GB)

(73) Assignee: BAE SYSTEMS PLC, London (GB)

( * ) Notice: Subject to any disclaimer, the term of this patent is extended or adjusted under 35 U.S.C. 154(b) by 0 days.

(21) Appl. No.: 17/429,704

(22) PCT Filed: Dec. 18, 2019

(86) PCT No.: PCT/GB2019/053597
§ 371 (c)(1),
(2) Date: Aug. 10, 2021

(87) PCT Pub. No.: WO2020/128459
PCT Pub. Date: Jun. 25, 2020

(65) Prior Publication Data
US 2022/0206299 A1    Jun. 30, 2022

(30) Foreign Application Priority Data

Dec. 19, 2018 (EP) ........................................ 8275185
Dec. 19, 2018 (GB) ..................................... 1820701

(51) Int. Cl.
*G02B 27/01* (2006.01)
*G02B 27/00* (2006.01)
(Continued)

(52) U.S. Cl.
CPC ..... *G02B 27/0172* (2013.01); *G02B 27/0093* (2013.01); *G09G 5/10* (2013.01);
(Continued)

(58) Field of Classification Search
USPC ............................................................. 345/8
See application file for complete search history.

(56) References Cited

U.S. PATENT DOCUMENTS 8,681,073 B1    3/2014 Robbins et al.
10,451,707 B1 *  10/2019 Castaldi ................ G01S 5/0247
(Continued)

FOREIGN PATENT DOCUMENTS

DE    102012004303 A1    9/2013
DE    102016223908 A1    6/2018
(Continued)

OTHER PUBLICATIONS

International Search Report and Written Opinion received for PCT Application No. PCT/GB2019/053597, dated Apr. 20, 2020. 13 pages.
(Continued)

*Primary Examiner* — Chineyere D Wills-Burns
(74) *Attorney, Agent, or Firm* — Finch & Maloney PLLC

(57) ABSTRACT

A method is provided for adjusting a luminance profile of an image displayed on a look-through display to a user. The method comprises: determining a field of view of the user based on a spatial configuration of the user's head. Determining one or more lighting conditions in the field of view. Adjusting the luminance profile for the image based on the field of view, wherein, as a result of the adjusted luminance profile, the image is reconciled with the field of view.

20 Claims, 5 Drawing Sheets

(51) Int. Cl.
*G09G 5/10* (2006.01)
*G06F 3/147* (2006.01)
*G06F 3/01* (2006.01)
*H04N 5/58* (2006.01)

(52) U.S. Cl.
CPC ............. *G02B 2027/0118* (2013.01); *G09G 2360/141* (2013.01); *G09G 2360/144* (2013.01)

(56) References Cited

U.S. PATENT DOCUMENTS

| | | | | |
|---|---|---|---|---|
| 2007/0236517 | A1* | 10/2007 | Kimpe | G09G 3/2092 345/690 |
| 2012/0132806 | A1 | 5/2012 | Findlay et al. | |
| 2013/0114043 | A1 | 5/2013 | Balan et al. | |
| 2013/0222354 | A1 | 8/2013 | Koivunen | |
| 2014/0111567 | A1* | 4/2014 | Nathan | G09G 3/3233 345/694 |
| 2014/0184496 | A1* | 7/2014 | Gribetz | G06F 3/013 345/156 |
| 2016/0314762 | A1 | 10/2016 | Lee et al. | |
| 2016/0329028 | A1* | 11/2016 | Simmons | G02B 27/0172 |
| 2017/0337857 | A1* | 11/2017 | Tiberi | G06F 3/016 |
| 2017/0343809 | A1 | 11/2017 | Benesh et al. | |
| 2018/0097867 | A1* | 4/2018 | Pang | H04N 5/22541 |
| 2018/0188803 | A1 | 7/2018 | Sharma et al. | |
| 2018/0218711 | A1 | 8/2018 | Suzuki et al. | |
| 2018/0286070 | A1* | 10/2018 | Benedetto | G06F 3/013 |

FOREIGN PATENT DOCUMENTS

| | | |
|---|---|---|
| EP | 2750125 A2 | 7/2014 |
| EP | 3357734 A1 | 8/2018 |
| WO | 2020128459 A1 | 6/2020 |

OTHER PUBLICATIONS

GB Search Report under Section 17(5) received for GB Application No. 1820701.9, dated Jun. 13, 2019. 3 pages.

Extended European Search Report received for EP Application No. 18275185.9, dated Jun. 5, 2019. 16 pages.

Jang Woncheol; et al. "Human field of regard, field of view, and attention bias", Computer Method and Programs in Biomedicine, Elsevier, Amsterdam, NL, Jul. 19, 2016, pp. 115-123.

* cited by examiner

METHOD AND SYSTEM FOR ADJUSTING LUMINANCE PROFILES IN HEAD-MOUNTED DISPLAYS

BACKGROUND

The present invention relates to improvements in or relating to luminance profile control in head-mounted display systems, particularly but not exclusively to those for use in aviation, ground vehicles or at a workstation.

The use of head-mounted displays (HMDs) and head-worn displays (HWDs) in many scenarios is becoming more common. In this application, the terms HMD and HWD will be used interchangeably. HMDs can aid users, for example vehicle operators, by displaying images to the user that contain useful symbology and other information. The displayed information is intended to improve the decision-making and/or operation of the vehicle by the HMD user, and to reduce the workload of the user by providing relevant information to the user in an accessible manner. In examples, symbology may include positional information displayed to the user at a predetermined position on the HMD, or may include a projection of a location of the user's destination overlaid onto the external environment. Additionally or alternatively, the HMD may display images that provide labels to the user corresponding to instruments in the vehicle interior.

In use, HMDs may be used at any time of day or in simulated environments. HMDs may also be used in different or changing environments. To adapt to each situation, conventional HMDs incorporate a photodetector, photodiode or other sensor configured to measure the instantaneous luminance level of the entire surrounding environment or an average luminance level of a specific, fixed region. The HMDs are configured to alter the luminance level or intensity of the images displayed to the user according to the luminance level measured by the photodetector. However, this assumes that the lighting condition of the environment is uniformly distributed.

In reality, this is unlikely to be the case, and several different lighting conditions may exist within an environment. Using conventional systems, images displayed to the user via their HMD that have a general luminance level set according to the measurements of a photodetector may not be optimised compared to a lighting condition within the environment and so may impair visibility for the user.

Accordingly, one object of the present invention is to overcome the problems of existing HMDs.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Aspects of the invention are provided in the independent claims.

According to an aspect of the invention, there is provided a method for adjusting a luminance profile of an image to be displayed on a look-through display to a user, the method comprising: determining a field of view of the user based on a spatial configuration of the user's head; determining one or more lighting conditions in the field of view; and adjusting the luminance profile for the image based on the field of view, wherein, as a result of the adjusted luminance profile, the image is reconciled with the field of view.

The method may comprise transmitting the luminance profile for use in displaying the image to the user by the head-mounted display.

The luminance profile may be variable. The luminance profile may be capable of including a plurality of different luminance levels.

The method may comprise, in response to determining that more than one lighting conditions exist in the field of view, determining the lighting conditions comprises determining a value of a lighting parameter for each distinct lighting condition. The adjusted luminance profile may comprise at least one luminance level corresponding to each distinct lighting condition.

Adjusting the luminance profile for the image may comprise sacrificing grey shades to artificially adjust luminance levels corresponding to lighting conditions other than the lighting condition having the highest determined value for the lighting parameter.

Sacrificing grey shades may comprise reducing the number of addressable grey shades in the image.

Adjusting the luminance profile for the image may comprise adjusting the luminance level corresponding to the lighting condition having the highest determined value for the lighting parameter.

Adjusting the luminance profile may comprise adjusting luminance levels corresponding to individual light sources of an image generation unit.

An image may be reconciled if the variation between the luminance profile of the image and the lighting conditions is reduced.

The variation may be determined based on individual luminance levels. The reduction may be quantified using a percentage threshold.

Adjusting the luminance profile for the image may comprise generating an image having an adjusted luminance profile. Transmitting the luminance profile may comprise transmitting the image to the head-mounted display.

Determining one or more lighting conditions in the field of view may comprise selecting at least one appropriate lighting data source based on the field of view. Determining one or more lighting conditions in the field of view may comprise receiving data from the lighting data source indicating the current lighting conditions.

Selecting at least one appropriate lighting data source based on the field of view may comprise identifying areas within the field of view having distinct lighting conditions. Selecting at least one appropriate lighting data source based on the field of view may comprise determining a pre-set lighting data source for each lighting condition. The lighting data source may provide information regarding the lighting conditions.

The lighting data source may comprise one selected from: a luminance sensor; a data store; an artificial lighting control system; or a data link.

The lighting data source may be a luminance sensor, and the luminance sensor may be a photodetector, light sensor, and/or a camera.

The method may comprise determining a spatial configuration of the user's head. The field of view may be determined based at least in part on the spatial configuration.

Determining the spatial configuration of the user's head may comprise determining the position and/or orientation of user's head.

Determining the spatial configuration of the user's head may comprise determining the position and orientation of the user's head relative to a predetermined coordinate system.

Determining the spatial configuration of the user's head may comprise receiving data from a head-tracking system.

The method may comprise inferring, from the spatial configuration of the user's head, a visual field of view of the user. The method may comprise comparing the visual field of view against a model environment. The method may comprise identifying points of intersection between the visual field of the view and the model environment. Determining a field of view of the user may comprise determining a field of view formed by the points of intersection.

According to an aspect of the invention, there is provided a system for adjusting a luminance profile of an image displayed on a head-mounted display being worn by a user based on lighting conditions, the system comprising a head-tracking system and a processor, the system being configured to carry out the method described above.

The system may comprise a head-mounted display configured to receive the transmitted luminance profile and display an adjusted image having the adjusted luminance profile.

The head-mounted display may comprise an optical combiner. The system may comprise an image generation unit. The optical combiner may present a generated image for viewing by a user against an outside scene. The image generation unit may include one or more light sources. The image generation unit may comprise an addressable illuminator.

The above features may be combined as appropriate, as would be apparent to the skilled person, and may be combined with any of the aspects of the examples described herein.

BRIEF DESCRIPTION OF THE DRAWINGS

Embodiments of the invention will be described, by way of example, with reference to the following drawings, in which.

DETAILED DESCRIPTION

In general, the present invention relates to improvement in or relating to adjusting a luminance profile of an image displayed on a head-mounted display (HMD) being worn by a user based on lighting conditions.

The present invention relates to a method that ensures that images displayed on a HMD worn by a user are reconciled with the lighting conditions of the surroundings against which they are viewed. Reconciliation of images and lighting conditions can be considered to be achieved if the luminance profile of images is suitably altered to ensure that the image content is discriminable to the user against the background of the lighting conditions and so that the image content is harmonized against the background. As a result, the images are visible and the user's vision is not impaired by the light and environment conditions in which the user is located. For example in situations where the brightness of the conditions may impair the user's vision. In the method, the user's field of view is determined, and that field of view is used to identify information relating to lighting conditions within that field of view. The field of view indicates where the user is looking in relation to their surroundings, i.e. relative to local and/or global references. Using the lighting condition data, a luminance profile for displaying images on the HMD can be generated such that the images are visible and are not perceived in a detrimental manner. The images are subsequently transmitted for display to the user. This is particularly useful in situations where there is a high contrast ratio between two different regions of the background environment, such as the contrast between interior of an aircraft and the exterior environment at any time of the day.

Figure 1:
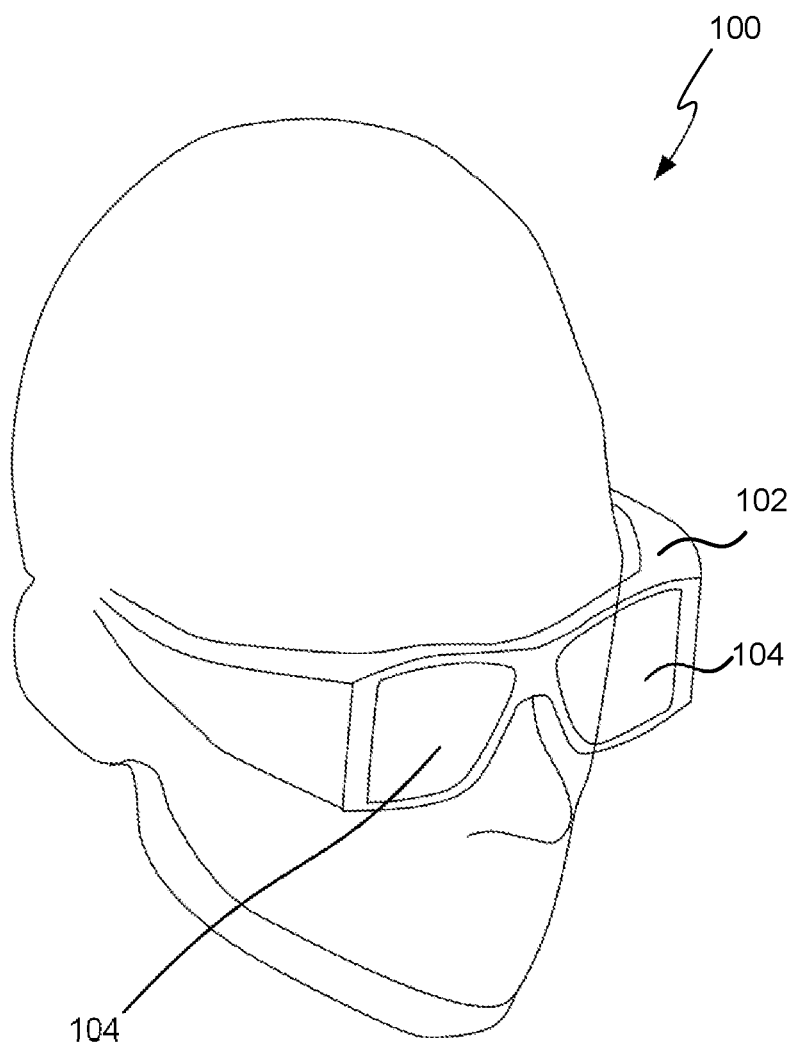
FIG. 1 is a diagram showing an example of a head-mounted display.

FIG. 1 shows an exemplary representation of an HMD shown generally at 100. In combination with the system of FIG. 2 (which will be described later), the HMD 100 is capable of augmenting the user's environment with images capable of assisting the user. According to the invention, the HMD 100 displays images to the user at a luminance profile that is adjusted relative to the lighting conditions of the environment against which the images are viewed.

The HMD is wearable by means of an appropriate support 102. The support includes one or more optical elements 104 which can be viewed by one of both eyes of the user. The HMD further includes a control system (not shown).

The HMD can be of any appropriate type including googles, glasses, a helmet or helmet visor. Ideally, the device is portable or adapted to be portable by means of the support. Although not shown in detail the support may include a support adapted to support the optical elements in front of the eye. The support may include: frames; side arms and supports for goggles and glasses; a helmet or visor; a headband; a neck or shoulder worn support; a gaming headset; or any other support that could be worn to hold the optical elements in the desired position.

The control system is variable depending on the use of the HMD. The control unit may be in situ or remote from the HMD. The control device may include a communications module for communicating with the optical elements and with other modules either on the HMD or remote therefrom. The communications may be wireless and/or wired. The control module may include different modules for carrying out different functions. These functions are not limited in any way but may include imaging, tracking, scene generation, processing, storage, power supply, audio etc.

The one or more optical elements 104 may be any appropriate type, such as, for example, an eyepiece or waveguide. Although not shown in detail, the optical elements 104 include a substantially transparent display medium. The user is able to view the environment through the optical elements 104, as well as any image relayed to the eye of the user in use via the HMD.

The HMD is able to generate images in an image generation unit (not shown in FIG. 1) and display images to the user in any suitable way, including projecting images to the user via the optical elements. Images may be displayed statically on the HMD, so that the images are displayed to the user regardless of where they are looking, or statically relative to the user's environment, so that movements of the HMD and user's head are matched by a corresponding movement of the image. Displaying images statically on the HMD is useful for symbology and particular operational information within the context of a vehicle environment. For example, symbology can comprise altitude, directional, or speed information that the user should be aware of at all times. Examples of images that may be displayed statically relative to the user's environment are landmark information of the external environment or labels for particular instruments within the interior environment.

Figure 2:
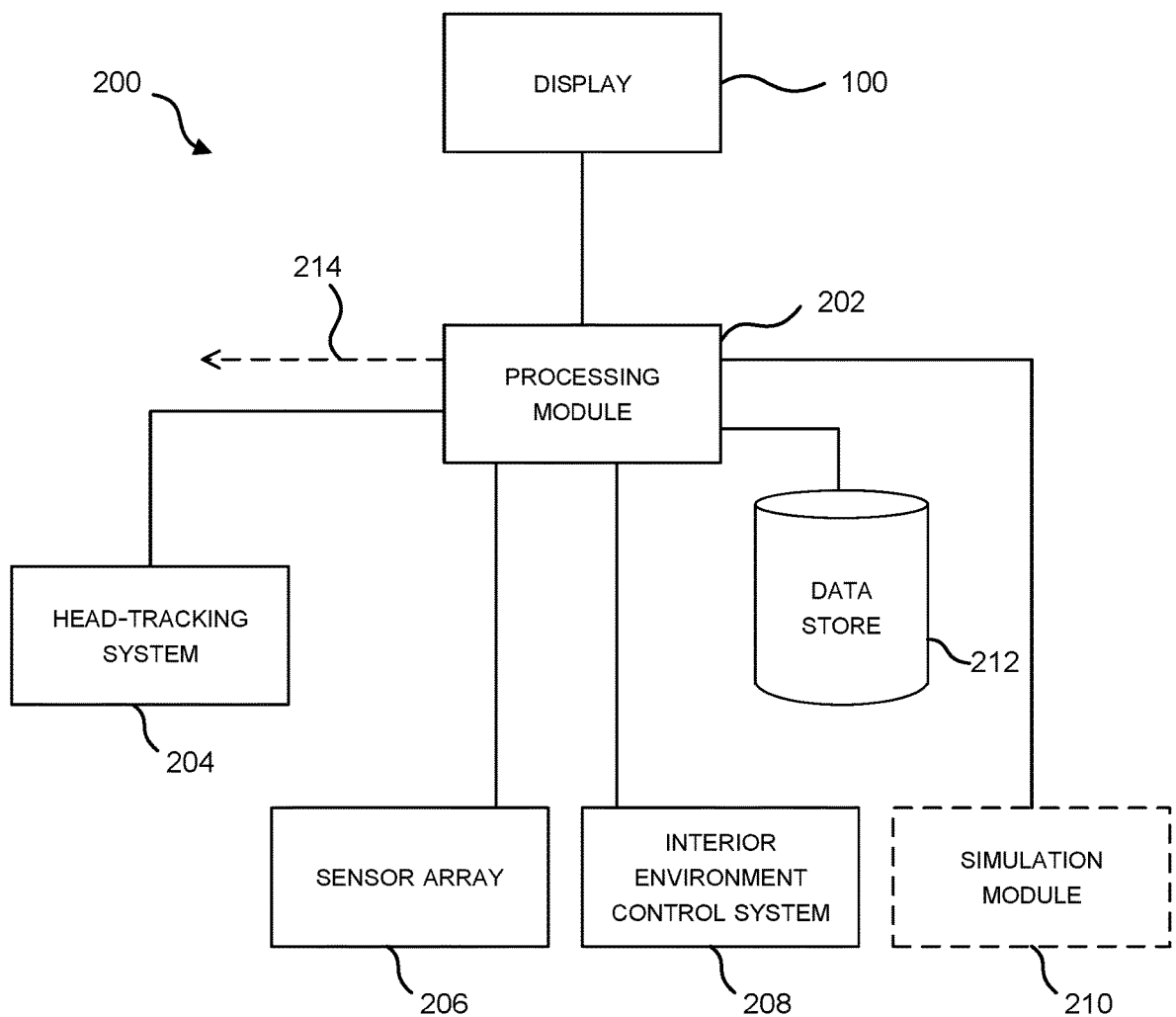
FIG. 2 is a diagram of a system according to an embodiment of the present invention.

FIG. 2 shows a block diagram of a system 200 according to an embodiment of the invention. The system 200 includes the HMD 100. The system 200 adjusts a luminance profile for displaying an image to the user on the HMD 100 according to the lighting conditions of the user's surroundings and particularly a field of view lying within a visual field of the user. The visual field of the user is the field that the user can view by moving their head and may also be known as the field of regard.

The system 200 includes a central processing module 202 that gathers and analyses data from a plurality of sources and generates outputs for transmission to the connected HMD 100, such as that of FIG. 1. Where used in relation to output luminance profiles or levels for the HMD, "transmission", "transmit", and "transmitting" is intended to encompass transmission to any part of the HMD. For example, the transmission may be from a control system of the HMD to the optical system or from an external system to the HMD more generally. The connection between the HMD and processing module may be wired or wireless using an appropriate protocol. The processing module may double as the control system of the HMD. Alternatively, the HMD may have an individual control system.

The processing module 202 is in communication with devices, systems, or modules from which it is able to gather data in order to generate an output for transmission to the HMD. Shown in FIG. 2 are a head-tracking system 204, a sensor array 206, a simulation module 210 (if the user is using a simulator), an interior environment control module 208 (or artificial lighting control system), a data store 212, and a data link 214 for connecting to an external data store (not shown). For clarity, other systems or modules from which the processing module 202 gathers data are not shown in FIG. 2. However, it will be appreciated that the content display to a user via the HMD may be generated by the processing module using numerous other sensing systems such as navigational modules, data stores, or information received via a communications network, as required.

The individual elements of the system will now be considered in more detail, beginning with the head-tracking system 204. The head-tracking system determines a spatial configuration of the HMD user's head. The term spatial configuration is intended to encompass at least one of a position of the head and an orientation of the head, and may be a combination of the two components. The position and/or orientation of the head may be determined relative to a predetermined coordinate system, such as a 3D model of the environment.

The head-tracking system 204 may be any head-tracking system suitable for tracking position and/or orientation of the user's head, directly or indirectly. For example, the head-tracking system may be an inertial measurement unit, or may utilise cameras and/or sensors to track fiducials, i.e. a camera mounted on the HMD to track fiducials within the interior, or a camera mounted within the interior to track fiducials on the HMD. The head-tracking system may comprise optical sensors, acoustic sensors, electromagnetic sensors, accelerometers, or other means mounted in the HMD and/or the interior environment. The head-tracking system may also incorporate a processing system to determine the spatial configuration from sensor data. As specific implementations of head-tracking systems are not the subject of this application and would be known to the skilled person, they will not be discussed in further detail here.

In some embodiments, the head-tracking system 204 utilises vehicle orientation and/or position data from vehicle sensors to determine the position of the HMD in relation to a global reference.

In order to correctly adjust the luminance profile of the images displayed to the user, the lighting conditions of the user's surroundings are determined. The system includes data sources, such as the sensor array 206, the interior environment control system 208, the simulation module 210, or the data store.

The sensor array 206 comprises a light, or luminance, sensor. The light sensor is configured to measure at least one parameter to determine lighting conditions. In particular embodiments, the light sensor detects luminance level. In those examples, the light sensor is a photodetector or an auto-brilliance sensor or a camera. The light sensor may be internally or externally mounted to the aircraft. The sensor array may be partly or wholly shared with the head-tracking system, or may be a separate set of sensors.

The interior environment control system 208 provides further input to the processing module. Among other things, the interior control system may illuminate instruments within the interior environment. The input received by the processing module from the interior control system is indicative of how the instruments are illuminated, e.g. to what intensity, luminance level, colour, and other parameters, and enable the processing module to determine lighting conditions for the interior environment, for use in adjusting the luminance profile of images viewed on the HMD by the user against the interior environment.

If the HMD is being worn in a simulator environment, the processing module 202 connects with a simulation module 210. The simulation module 210 provides information relating to the operation of the simulator for use in determining lighting conditions. For example, the relevant lighting information and luminance level or profile of projected simulator imagery may be provided by the simulation module 210.

Figure 3:
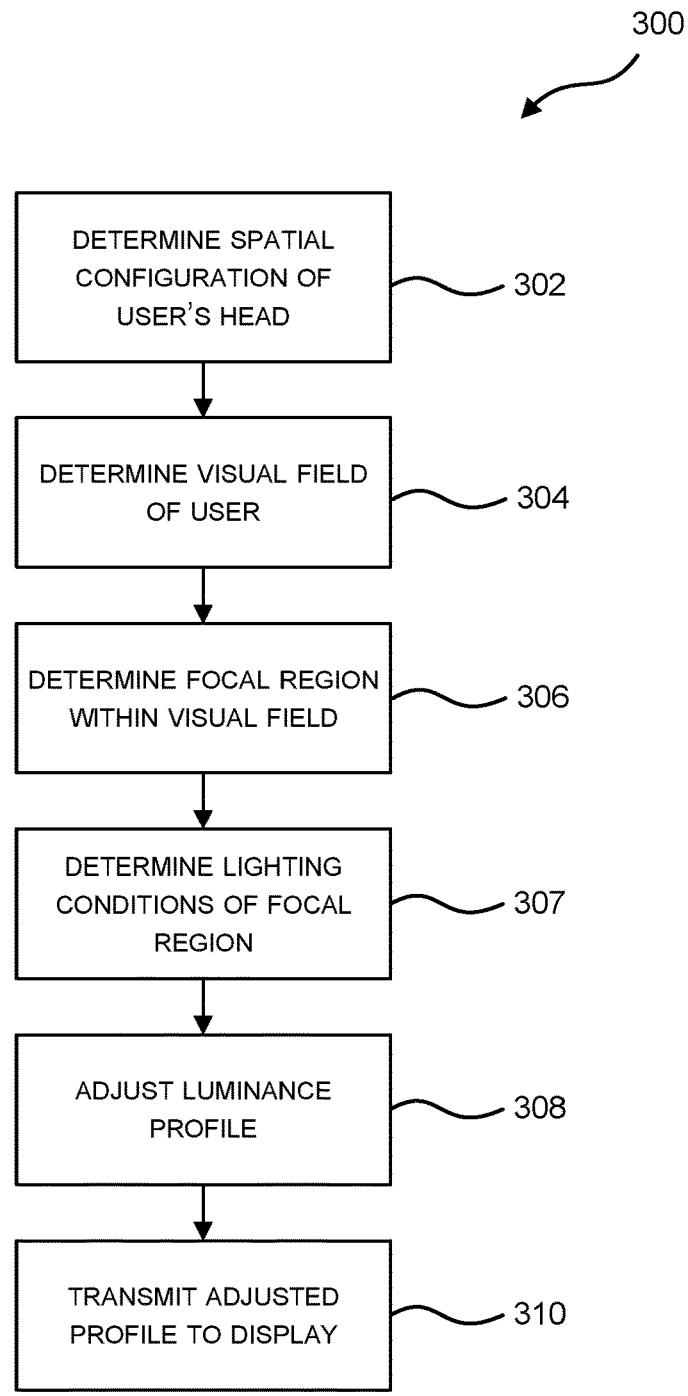
FIG. 3 is a diagram showing a flow chart for adjusting the luminance profile of images displayed on a head-mounted display (HMD) according to an embodiment of the present invention.

FIG. 3 shows a flow chart illustrating a method 300 that governs that operation of the system of FIG. 2. For the purposes of the explanation of the method 300 of FIG. 3, it is assumed that the HMD is being worn by the user and that the HMD is operational to display images to the user.

Initially in the method 300, the spatial configuration of the user's head is determined 302. This is typically performed by the head-tracking system. As discussed above, position and/or rotation are considered to determine a spatial configuration. The head-tracking system shares spatial configuration data with the processing system.

Using the spatial configuration data, a visual field of view of the user corresponding to the spatial configuration data is determined or inferred 304. Essentially, the direction of the user's gaze is determined based on the spatial configuration data, and an estimation of what is visible to the user is applied to the spatial configuration data. This may be performed by the head-tracking system and/or by the processing module.

The visual field of view may be determined in a number of ways. In a particular example, the spatial configuration of the user's head is mapped to a 3D model of the interior of the aircraft in which the user is located. A visual cone is generated, inferring the visual field of view of user relative to the user's head, and this can be used within the 3D mode.

The visual field of view may be variable. The visual field of view may vary depending on different factors, such as individual users, time of day, or direction of view.

The determined visual field of view may be used by the system to determine 306 a focal region of the user that falls within the visual field of view. In other words, the system determines what the user is currently looking at in their surroundings, based on the position of their head.

The focal region may be determined based on a comparison of the visual field of view with a model environment, using the 3D model or as part of the predetermined coordinate system used for spatial configuration determination for example. By identifying where the visual field of view and the model environment interact or intersect, the focal region can be determined. In particular, by comparing the model and visual field of view, points of intersection can be identified, and the focal region can be determined based on these points. The focal region may be considered to be a 2D representation/projection of a portion of the 3D, model environment.

At the next step of the method, 307, the lighting conditions present within the focal region are determined. The lighting conditions, typically the instantaneous luminance levels or profile present across the focal region, are determined based on data gathered from one or more data sources of the system 202. As previously described these data sources comprise a sensor array 206, an interior environment control system 208, a simulation module 210 and a data store 212. Having determined a focal region for which lighting conditions should be determined, the system may compare the focal region with the model environment. Regions of the model environment may have associated indicators that can be used to determine the relevant data source from which to gather lighting condition data. By comparing the model and focal region, the relevant data sources can be selected for the focal region, so that data can be retrieved from the sources as required.

Having determined the focal region of the user and the lighting conditions therein, a luminance profile for one or more images on the HMD is adjusted 308 by the processing module 202. The luminance profile may be variable and may be capable of including one or more luminance levels corresponding to one or more portions of the focal region.

The luminance profile is adjusted to accommodate the lighting conditions. In other words, the luminance profile is adjusted to cause the image to be reconciled or harmonized with the environment against which it is viewed. An image is considered to be reconciled if the variation or difference between the lighting of the image and the lighting conditions of the focal region is reduced, preferably to within a percentage threshold value. In some embodiments, reconciliation can be measured by comparison of luminance levels, and calculation of a contrast ratio. A typical contrast ratio of 1.2:1 or greater is desirable to allow the display to be visible to the user. Contrast ratio can be calculated as follows:

$$\text{Contrast Ratio} = \frac{L_{ambient} + L_{display}}{L_{ambient}}$$

$L_{ambient}$ is the ambient luminance (of the external environment), and $L_{display}$ is the display luminance. The contrast ratio calculation can be adapted to take into account the transmission of and losses or reductions caused by optical elements of the HMD.

As a result of adjustment of the profile to cause better reconciliation, the image will be visible to the user without introducing optical artefacts such as background glow. Examples are provided in relation to FIG. 4, which is discussed below.

Returning to FIG. 3, the luminance profile is adjusted from a previous or nominal level based on the retrieved data that relates to the focal region.

In some embodiments, the focal region has only one lighting condition. In these embodiments, the luminance profile comprises a luminance level, and a single data source is required to retrieve data to adjust the image accordingly. Adjusting a single luminance level for an image or images on a HMD is effectively implemented by modulating a single light source or display source to present the images to a user via the optical elements of the HMD.

In other embodiments, the focal region covers more than one area of the user environment and so more than one lighting conditions may be present, the distinct lighting conditions being quantified by the same or different data sources. Therefore, the luminance profile will comprise more than one luminance level, and these luminance levels may differ across the image. The luminance levels will be determined to correspond to each distinct lighting condition at least, the lighting conditions being quantified using a value for a lighting parameter.

Luminance profiles having more than one luminance level may be achieved using an addressable region illuminator, addressable region display source, multiple light sources or multiple display sources within the image generation portion of the HMD, to present the images to a user via the optical elements of the HMD.

Alternatively, a multi-level luminance profile may be achieved using a single light source or display source as a projector and artificially adjust the luminance levels for different regions by sacrificing available grey shades in the image. In the embodiments where shades of grey are sacrificed, a single global luminance level is set for the luminance profile that corresponds to a luminance level for the lighting condition that is the 'brightest', i.e. it has the highest value of the parameter used to quantify lighting conditions. Grey shades are sacrificed to artificially adjust luminance levels for lighting conditions other than the brightest.

Sacrificing grey shades is achieved by altering the addressable grey shade range. Ordinarily, an addressable grey shade range may have a range of 0 to 255. In a grayscale image, 0 corresponds to black, and 255 corresponds to white. The intermediate values are incremental grey shades. In regions that are determined to be less bright, and so require artificial adjustment of luminance levels, the addressable grey shade range can be altered to have a different maximum value that corresponds to white in a black and white image. For example, the grey shade values in the ordinary range could be multiplied by 0.5 and rounded, to create a maximum grey shade value of 128, the range being between 0 and 128, where 0 corresponds to black and 128 to white in a grayscale image. New incremental shades between 0 and 128 are used. In setting a new maximum, the resultant image would be dimmer with fewer addressable grey shades.

In some embodiments, grey shades may be sacrificed in combination with an illuminator or projector comprising multiple light sources, or an addressable region illuminator to achieve the adjusted luminance profiles.

In the next step of FIG. 3, the adjusted luminance profile is transmitted 310, or otherwise output, from the processing module to the HMD 100. The provision of the adjusted luminance profile to the HMD results in the HMD displaying images to the user that are reconciled with the lighting conditions against which they are being viewed.

In some embodiments, the adjusted luminance profile may be combined with images to be displayed by the processing module, and the images with an adjusted luminance profile may be transmitted to the HMD. In other embodiments, the adjusted luminance profile is communicated to the HMD as a parameter setting intended to replace the previously set luminance profile.

In some embodiments, the focal region may be determined based on the spatial configuration alone, with a plurality of spatial configurations being used for comparison, and a region output that corresponds with the spatial configuration.

In particular embodiments, the method 300 of FIG. 3 is applied to determine the spatial configuration of a user's head and to determine whether the user's visual field of view corresponds to the user looking substantially towards the external environment, substantially towards the interior environment, or a combination of the two. In a 3D model of a vehicle based interior environment, windows may therefore be used to designate that the region being viewed is the external environment. If required, a more precise determination may be made by dividing the interior and/or external environments into regions having their own specific luminance levels.

Figure 4:
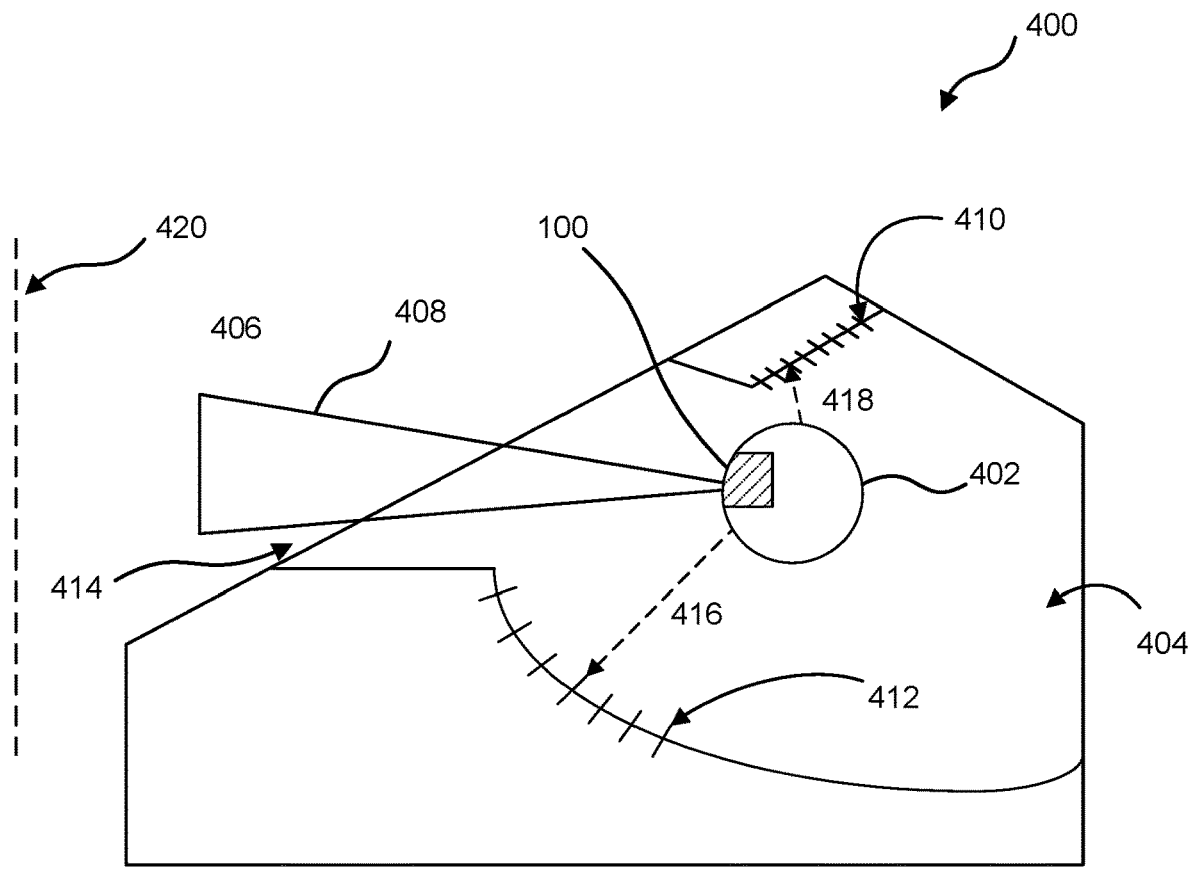
FIG. 4 is a simplified diagram of an aircraft interior.

The use of the method of FIG. 3 will now be explained with reference to the diagram of FIG. 4. FIG. 4 illustrates a user's head within a model environment. In FIG. 4, the user's head, 402 the interior environment 404, the external environment 406, HMD 100, and the visual field of view 408 are shown. The interior environment comprises an overhead portion 410 above the user's head 402 and a panel 412 in front of and below the user's head 402. The user is shown viewing the external environment 406, as the visual field of view 408 intersects a window 414. As such, only the external environment is considered to fall within the focal region, and so the lighting condition for the external environment is pertinent. However, if the user's visual field of view 408 were to be directed in the direction of arrows 418 and 416, i.e. generally towards the overhead portion 410 or the panel 412, the user would be considered to be viewing the interior 404, and the system 200 and method 300 would alter the luminance profile of the displayed images accordingly.

The operation of the system and the method vary according to the scenario in which it is employed. For example, in a daytime scenario, the lighting conditions of the exterior environment differ from those from the interior environment as the external environment has a higher luminance level. That is to say, that the external environment is perceived by the user as being brighter than the internal environment. For example only, the external environment may have a luminance five times greater than that of the interior which may be dimly lit in comparison. Therefore, the luminance of the HMD will need to be altered dynamically such that the contrast ratio of the images presented to the user via the HMD is maintained as the user looks between different portions of their environment.

In this example, for images displayed on the HMD to be visible to a user against the bright daytime external environment the contrast ratio should exceed 1.2:1 for it to be visible to the user, as a general rule. When an image is viewed using the HMD against the external environment with suitable contrast ratio, the image is considered to be reconciled with the environment. However, if the user's head moves and the image is displayed against the dimmer interior environment, displaying images at a high luminance level of may cause artefacts in the image that would alter the user's perception of the dimly lit interior, potentially obscuring important information. For example, because of the luminance level and the optical configuration, a background display glow may be caused, which would detract from the clarity of the display by changing the contrast ratio to an undesirable value. Against the interior, the image is not considered to be visually reconciled. Therefore, by using the system 202 to apply the method 300 of FIG. 3, an adjusted luminance level will be generated and transmitted to the HMD to reduce or eradicate the glow, or other issues, by creating a more visually reconciled image where the luminance level is reduced compared to its initial level and the variation between background and image is not as great.

In reverse, the same effect is seen. Images displayed at a first luminance level for visibility and minimised glow or artefacts against the interior environment would be adjusted according to an adjusted luminance level as part of a luminance profile by the system and method of the present invention if the user looked towards the exterior environment, increasing the luminance level of the images to a second luminance level that exceeds the first luminance level.

In an exemplary night-time scenario, the interior is dimly lit by illuminated instruments, controlled by the interior environment control system, while the external environment may be less bright than the interior. Therefore, using a conventional system, displaying images to be visible against the illuminated interior would result in an unwanted background glow or artefacts when viewing images against the external environment. This may hamper the user's perception of the external environment.

In terms of luminance level at night, the interior may be lit at approximately five times greater than the less bright exterior environment. In this case, a conventional system may display images at a luminance level to ensure visibility against the interior luminance level. In doing so, a glow against the dimmer external environment would be caused. According to the present invention, the luminance profile is adjusted according to the user's visual field of view, reducing the possibility that glow or low visibility of images impacts the user's perception of either their surroundings or the images on the HMD.

In another exemplary scenario, a screen 420 may also be included, particularly for a simulated mode of operation. This is also shown in FIG. 4.

In a simulated mode, the luminance levels may vary due to the presence of lighting illuminating the simulation screen to enable viewers to watch the user operating the simulator. It may also be the case that portions of the interior of the environment are simulated, while other parts are real and illuminated as in a real vehicle or scenario. Therefore, the external environment may have different lighting conditions than the realistic interior. Accordingly, the system of the invention operates to determine whether the user is looking at the real interior or the simulated environment at a given moment to determine the required luminance level at which to display the images.

When considering the method of FIG. 3 in the context of the above day- and night-time scenarios, a specific method may be used. A flow chart illustrating this method 500 is shown in FIG. 5.

Figure 5:
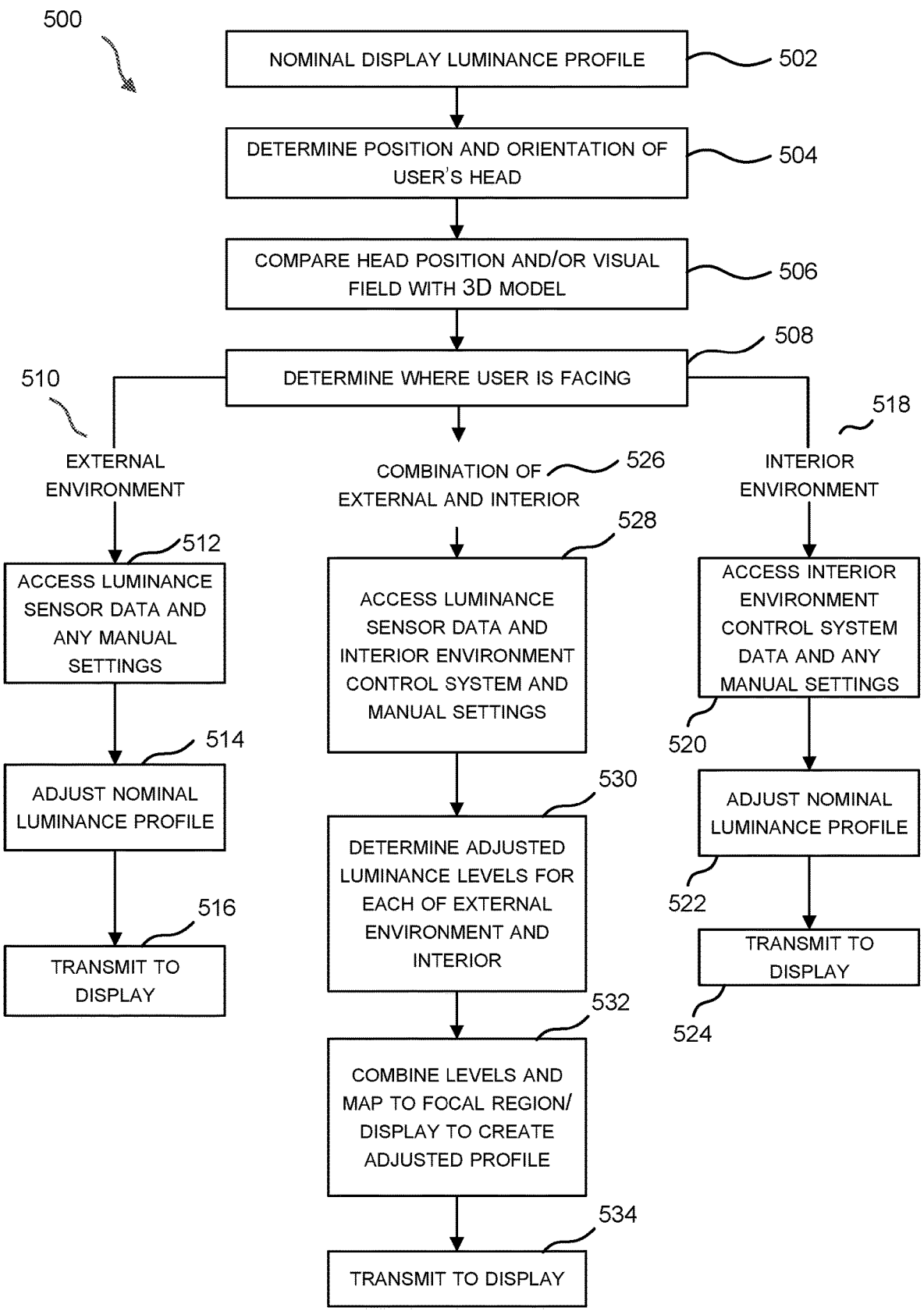
FIG. 5 is a diagram showing a flow chart for adjusting the luminance profile of images displayed on a head-mounted display (HMD) according to an embodiment of the present invention.

Initially, the method 500 of FIG. 5 includes setting a nominal luminance profile for the display images at step 502.

As in FIG. 3, the spatial configuration, i.e. position and orientation, of the user's head is determined in step 504.

At step 506, the position of the user's head, and their inferred visual field of view, are compared with a 3D model.

From the comparison, a determination at step 508 is made to determine the direction the user is facing, i.e. the focal region is determined.

If the user is facing the external environment 510, the focal region lies wholly over the external environment. By the method, the lighting conditions of the external environment are gained by accessing light sensor data and/or manual settings. Input data from the sensor array (i.e. the auto-brilliance sensor) and manual settings are accessed at step 512. The manual settings may be based on the mode of operation, and may be accessed from a data store connected to the system. For example, a manual setting may be set via a user interface associated with the HMD. The manual setting may comprise an override luminance value.

The nominal luminance profile is adjusted 514 to form an adjusted luminance profile, here comprising a luminance level because the user is facing the external environment only.

The adjusted profile is transmitted to the HMD at step 516.

If the user is facing the interior of the environment 518, an adjusted luminance profile is generated 522 accordingly using data accessed 520 from the interior environment control system, such as the luminance level of illuminated instrumentation, and/or manual settings.

Where the user's visual field of view is not wholly directed to one of the external environment or the internal environment, the focal region is determined to be a combination of the internal and external environments.

The lighting conditions within are determined to be both those of the internal and external environments, and so at step 528, both luminance sensor data for the external environment and interior environment control system data for the interior environment is accessed, along with any manual settings.

An adjusted luminance level for each individual portion of the region is determined at step 530.

These individual levels for each portion of the focal region are combined and mapped to image presented to the user on the HMD, to resemble the split between the internal and external environments according to the determined focal region at step 532. As a result, an adjusted luminance profile is generated.

The adjusted profile is transmitted to the HMD 534 for display to the user.

An additional step may be included that determines whether it is day or night time, or whether a simulator is being used. The luminance levels may be set according to pre-stored information, rather than using sensor data.

While the above embodiments have been described in relation to an internal and external environments and adjusting luminance level depending on whether the user is looking at the internal or external environments, the system and method may equally be applied to any situation involving aircraft, vehicles or workstations and the relevant operators or users wearing a HMD, and may also be applied to differentiate between different parts of the environment. For example, the method may operate differently according to whether the user is looking at land or sky from their vehicle, with the horizon being used by the system to judge what is being viewed. An example method may be to fuse tracking data obtained in relation to the HMD and position or location tracking data obtained in relation to the vehicle or wider system. The position of the horizon may be determined using an image processing system based on data obtained from an image sensor. Alternatively, or additionally, the position of the horizon may be initially known and a tracking system may utilise a model to recalculate the position of the horizon relative to the HMD.

Although the present invention has been described in connection with some embodiments, it is not intended to be limited to the specific form set forth herein. Rather, the scope of the present invention is limited only by the accompanying claims. Additionally, although a feature may appear to be described in connection with particular embodiments, one skilled in the art would recognize that various features of the described embodiments may be combined in accordance with the invention. In the claims, the term 'comprising' does not exclude the presence of other elements or steps.

Furthermore, the order of features in the claims does not imply any specific order in which the features must be performed and in particular the order of individual steps in a method claim does not imply that the steps must be performed in this order. Rather, the steps may be performed in any suitable order. In addition, singular references do not exclude a plurality. Thus, references to 'a', 'an', 'first', 'second', etc. do not preclude a plurality. In the claims, the term 'comprising' or "including" does not exclude the presence of other elements.

The invention claimed is:

1. A method for adjusting a luminance profile of an image to be displayed on a look-through display to a user, the method comprising:
   determining a field of view of the user based on a spatial configuration of the user's head;
   determining one or more lighting conditions in the field of view;
   in response to determining that more than one lighting condition exists in the field of view, determining the one or more lighting conditions includes determining a value of a lighting parameter for each distinct lighting condition, wherein the adjusted luminance profile comprises at least one luminance level corresponding to each distinct lighting condition; and
   adjusting the luminance profile for the image based on the field of view, wherein, as a result of the adjusted luminance profile, the image is reconciled with the field of view,
   wherein adjusting the luminance profile for the image includes reducing the number of addressable grey shades in the image to adjust luminance levels corresponding to one or more the lighting conditions other than the lighting condition having the highest determined value for the lighting parameter.

2. The method of claim 1, wherein adjusting the luminance profile for the image comprises adjusting the luminance level corresponding to the lighting condition having the highest determined value for the lighting parameter.

3. The method of claim 1, wherein adjusting the luminance profile comprises adjusting luminance levels corresponding to individual light sources of an image generation unit.

4. The method of claim 1, wherein an image is reconciled if the variation between the luminance profile of the image and the lighting conditions is reduced.

5. The method of claim 4, wherein the reduction is quantified using a percentage threshold.

6. The method of claim 1, further comprising generating an image having the adjusted luminance profile.

7. The method of claim 1, further comprising transmitting the luminance profile for use in displaying the image to the user by the display.

8. The method of claim 1, wherein determining one or more lighting conditions in the field of view comprises:
- selecting at least one lighting data source based on the field of view, the lighting data source providing information regarding the lighting conditions; and
- receiving data from the lighting data source indicating the current lighting conditions.

9. The method of claim 8, further comprising:
- identifying areas within the field of view having distinct lighting conditions; and
- determining a lighting data source for each lighting condition.

10. The method of claim 1, comprising determining the spatial configuration of the user's head, wherein the field of view is determined based at least in part on the spatial configuration.

11. The method of claim 10, comprising:
- inferring, from the spatial configuration of the user's head, a visual field of view of the user;
- comparing the visual field of view against a model environment; and
- identifying points of intersection between the visual field of view and the model environment, and wherein:
- determining the field of view of the user comprises determining a field of view formed by the points of intersection.

12. The method of claim 1, wherein the display is a head mounted or head worn display worn by the user.

13. A method for adjusting a luminance profile of an image to be displayed on a look-through display to a user, the method comprising:
- determining a field of view of the user based on a spatial configuration of the user's head;
- determining one or more lighting conditions in the field of view; and
- adjusting the luminance profile for the image based on the field of view, wherein, as a result of the adjusted luminance profile, the image is reconciled with the field of view,
- wherein an image is reconciled if the variation between the luminance profile of the image and the lighting conditions is reduced, and
- wherein the reduction is quantified using a percentage threshold.

14. The method of claim 13, comprising, in response to determining that more than one lighting condition exists in the field of view, determining the lighting conditions comprises determining a value of a lighting parameter for each distinct lighting condition, and wherein the adjusted luminance profile comprises at least one luminance level corresponding to each distinct lighting condition.

15. The method of claim 14, wherein adjusting the luminance profile for the image comprises reducing the number of addressable grey shades in the image to adjust luminance levels corresponding to one or more the lighting conditions other than the lighting condition having the highest determined value for the lighting parameter.

16. The method of claim 15, wherein adjusting the luminance profile for the image comprises adjusting the luminance level corresponding to the lighting condition having the highest determined value for the lighting parameter.

17. A method for adjusting a luminance profile of an image to be displayed on a look-through display to a user, the method comprising:
- determining a field of view of the user based on a spatial configuration of the user's head;
- determining the spatial configuration of the user's head, wherein the field of view is determined based at least in part on the spatial configuration;
- inferring, from the spatial configuration of the user's head, a visual field of view of the user;
- comparing the visual field of view against a model environment;
- identifying points of intersection between the visual field of view and the model environment, wherein determining the field of view of the user includes determining a field of view formed by the points of intersection;
- determining one or more lighting conditions in the field of view; and
- adjusting the luminance profile for the image based on the field of view, wherein, as a result of the adjusted luminance profile, the image is reconciled with the field of view.

18. The method of claim 17, wherein determining one or more lighting conditions in the field of view comprises:
- selecting at least one lighting data source based on the field of view, the lighting data source providing information regarding the lighting conditions; and
- receiving data from the lighting data source indicating the current lighting conditions.

19. The method of claim 18, further comprising:
- identifying areas within the field of view having distinct lighting conditions; and
- determining a lighting data source for each lighting condition.

20. The method of claim 17, wherein the spatial configuration includes one or both of (1) a position of the head and (2) an orientation of the head.

* * * * *